United States Patent [19]

Deleris

[11] 4,321,580

[45] Mar. 23, 1982

[54] PROCESS AND APPARATUS FOR ADJUSTMENT OF THE ANGULAR POSITION OF A PART IN ROTATIONAL MOTION

[75] Inventor: Robert Deleris, Bailly, France

[73] Assignee: Regie Nationale des Usines Renault, Boulogne-Billancourt, France

[21] Appl. No.: 110,748

[22] Filed: Jan. 9, 1980

[30] Foreign Application Priority Data

Jan. 9, 1979 [FR] France ............................... 79 00386

[51] Int. Cl.³ ............................................. G08C 19/16
[52] U.S. Cl. .......................... 340/870.24; 235/92 MP; 340/671
[58] Field of Search ................... 340/206, 189 R, 671, 340/672, 870.23, 870.24, 870.28, 870.29; 235/92 MP; 324/160, 162, 173

[56] References Cited

U.S. PATENT DOCUMENTS

| 3,725,794 | 4/1973 | Aspland | 328/129 |
| 3,745,364 | 7/1973 | Blank et al. | 328/41 |
| 3,745,544 | 7/1973 | Ono | 340/206 |
| 3,930,201 | 12/1975 | Ackermann et al. | 340/672 |
| 4,125,295 | 11/1978 | Ruhnau et al. | 340/671 |

FOREIGN PATENT DOCUMENTS 7426581 6/1974 France .

Primary Examiner—Thomas A. Robinson
Attorney, Agent, or Firm—Oblon, Fisher, Spivak, McClelland & Maier

[57] ABSTRACT

A method and apparatus for determining the angular position of a point in rotational motion which includes a disk coupled to rotate with the rotating part. The disk includes a plurality of alternating teeth and spaces located about its periphery. At least one of the teeth has been removed to form an absolute or reference mark. A transducer is located adjacent to the disk to produce an electrical signal representative of the passage of teeth and spaces past the transducer. The electrical signal is processed to produce one or more output signals representative of the instantaneous angular position of the rotating part. Accurate results are produced even when large variations in instantaneous speed of the rotating part occur.

4 Claims, 9 Drawing Figures

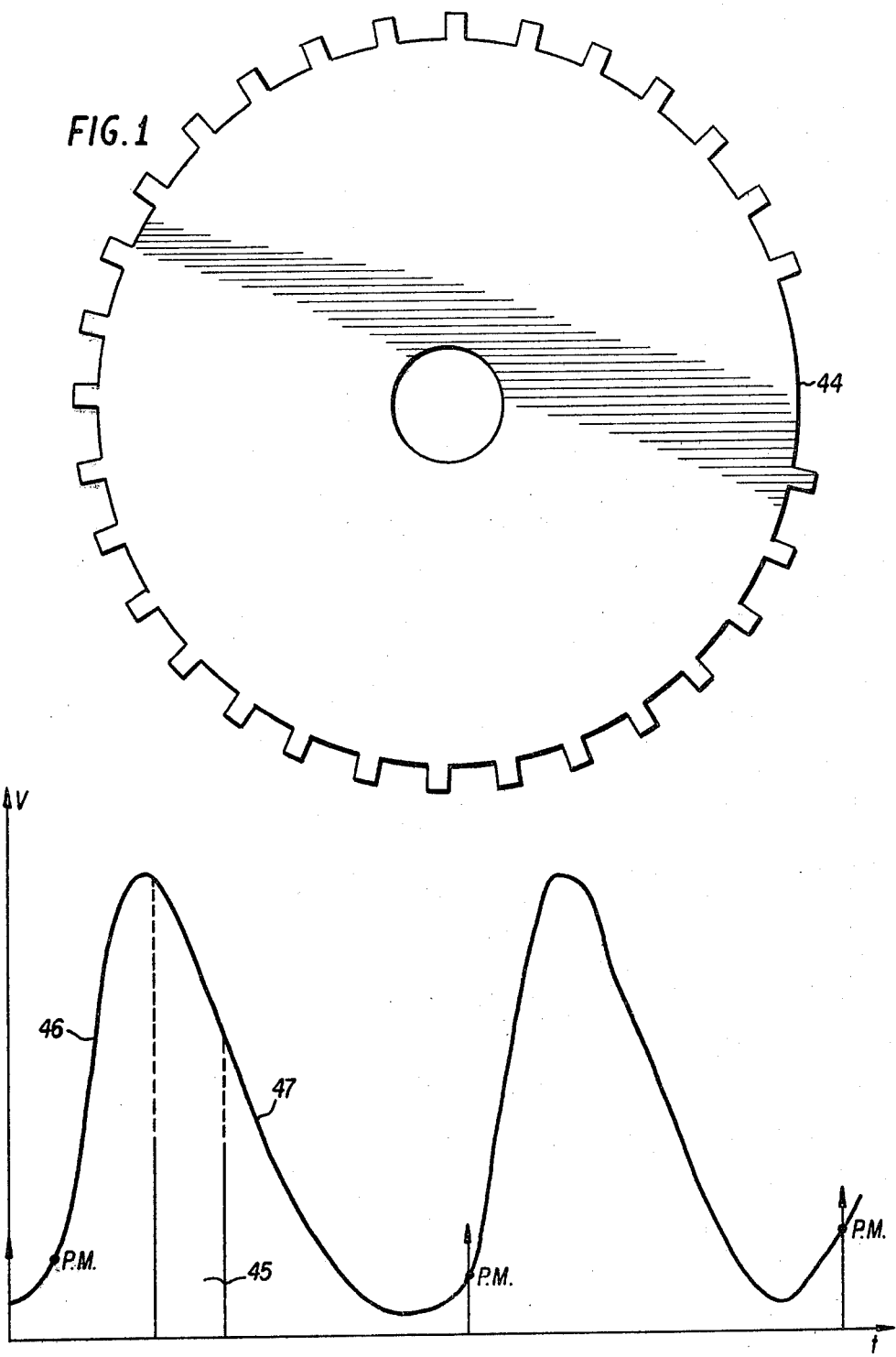

PROCESS AND APPARATUS FOR ADJUSTMENT OF THE ANGULAR POSITION OF A PART IN ROTATIONAL MOTION

BACKGROUND OF THE INVENTION

1. Field of the Invention:

The present invention concerns improvement in systems for the adjustment of the angular position of parts in rotational movement by means of an object connected to the moving part and having discontinuities in shape or material, and by means of a single sensor for supplying regular signals whenever the shaft is in given angular positions and for forming a reference signal.

2. Description of the Prior Art

In an automobile, for example, an impulse transmitter is used which supplies a signal whenever the crankshaft is in a given position (for example, at the high dead point or bottom of the engine cycle relative to one or more cylinders) and which supplies a series of impulses for determining the exact angular position of the crankshaft. In order to generate these two types of signals, a disk having a tooth at the points of reference is generally placed next to a toothed disk having a number of raised teeth. This operation is burdensome and difficult to perform because of the space required by the device, the number of targets and sensors and the difficulty of obtaining synchronized signals following thorough adjustment of the two targets.

Others have attempted to avoid these disadvantages using a single sensor by eliminating a tooth of the target or by adding a tooth locally and detecting the discontinuity thus produced so as to produce an adjustment impulse upon the passing of the first tooth following the discontinuity.

Nevertheless, these systems involve several disadvantages: on the one hand, they require an impulse rate having a cyclic ratio of one between the width of the tooth and the space between the teeth, which is difficult to obtain in practice where the target is often slightly out of round or, in the case of cold-starting an internal combustion engine, when very large variations of instantaneous speed are observed, on the order of 1 to 10 over a half turn, throwing off all presently used systems. Furthermore, placing the discontinuities on the dead points, as is often described, involves disadvantages in the starting phases since the differential quotient of the angular speed is cancelled out and changes sign at the moment the discontinuity passes. There then remains the possibility of placing the discontinuity at a point more favorable for its detection, but in this case the information on passage of the dead points is no longer given.

SUMMARY OF THE INVENTION

Accordingly, one object of this invention is to provide a novel means for overcoming the various disadvantages of the prior art systems.

The present invention, relating to a decoding process using digital techniques and therefore being especially adapted for use with large-scale integrated circuits, is an improvement upon the position adjustment systems which use only a single sensor and have missing teeth on the basic target, enabling the system to operate with any cyclic ratio and enabling cold-starting of internal combustion engines without causing the detection system to fail. The turning shaft is equipped with a disk having teeth at regular intervals, at least one of which has been eliminated at a preferential position in order to create an absolute mark.

A position sensor is placed opposite the disk detecting the passage of the teeth. This sensor, as well as the electronics for processing the signal, can be of any type, e.g., opto-electronic, magnetic, high frequency current, Hall effect, or in another similar known way. The number of teeth on the disk is optional but the greater the number, the greater is the precision with which the position of the turning shaft is determined in cases of variable speed. Unfortunately, the technological problems in obtaining a target with a great number of teeth, as well as the sensitivity of detection of the sensors, limit this number generally to a number lower than that required for this precision. The decoding process of the present invention enables restoration of the angular adjustment signal with a relatively slight error, and of an interpolation signal enabling target resolution commensurate with requirements.

According to a first aspect, the present invention concerns a process for adjusting the angular position of a part in rotational motion, integral with a disk having a succession of teeth and spaces at its periphery, at least one tooth of which is eliminated to form an absolute mark, comprising a position sensor placed opposite the periphery of the disk to detect passage of teeth and spaces, characterized by the fact that an electronic interpolation of the input signal coming from the position sensor is performed, and that the input signal is restored within the rotation cycle only to the extent that it corresponds to a characteristic signal, i.e., when the absolute mark passes the sensor during a phase of variation in steady speed or constant speed.

According to a second aspect, the present invention concerns an apparatus for decoding the angular position of a part in rotational motion through an application of the preceding process. This apparatus is characterized by the fact that it comprises a means for implementing an electronic interpolation of the input signal coming from the position sensor, a means for counting the number of interpolation impulses having passed since the beginning of the last tooth, a blocking means for elimination of interference signals and a means for the restoration of particular positions within the rotation cycle.

According to the preferred apparatus embodiment, the means for carrying out an electronic interpolation of the input signal includes a holding counter for accumulating the impulses supplied by a clock operating at frequency F, and a live memory having its inputs connected to the outputs of the holding counter. The outputs of the live memory are coupled to the inputs of a calculator which is connected through its outputs to the inputs of a state detector. One of the outputs of the state detector is coupled to a loading input of calculator.

According to the preferred apparatus embodiment, the calculator operates at a frequency of nF with a whole and positive number n and is charged with the memory value in the live memory whenever its content reaches a programmed value.

According to another portion of the preferred apparatus embodiment, a means for counting the number of interpolation impulses having passed from the beginning of the last tooth includes a decoding counter having an input coupled to the output of the state detector and having an output coupled to a flip-flop of the RS type storing a decoding of the coupled decoding counter until the latter is reset at zero.

According to another portion of the preferred apparatus embodiment, the means for restoring the particular positions within the rotation cycle includes a discontinuity counter connected through its inputs to two outputs of the blocking means supplying it respectively with a reset signal and an incremental signal. The outputs of the discontinuity counter are coupled to the inputs of a state decoder which is connected through one of its outputs to an input of the blocking means and through two other outputs to gates intended for restoration of particular positions of the rotation cycle.

According to another portion of the preferred apparatus embodiment, the blocking system includes a means for assisting in resetting the discontinuity counter when the counting of teeth preceding the reset of the counter has not arrived at a number equal to that normally separating two successive discontinuities, a means for activation only when the counting of the teeth separating two resets of the discontinuity counter has been equal at least once to the count normally separating two successive discontinuities and when the blocking means is in operation, a means to restore impulses corresponding to the absent teeth so as to guide other associated devices, and a means for blocking the resetting of the discontinuity counter as long as the tooth count is not at least equal to that normally separating two successive discontinuities.

According to still another portion of the preferred apparatus embodiment, a logic AND gate is connected through its inputs, to the output of the control logic giving the load signal on the one hand and, on the other, to the nonreversible output of the RS type flip-flop; and through its output, to an input of the load logic on the one hand and, on the other, to an input of the blocking system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates a preferred embodiment of the target;

FIG. 2 illustrates a representative curve of the speed of the crankshaft of an internal combustion engine in its starting phase, as a function of time;

DESCRIPTION OF THE PREFERRED EMBODIMENTS

Figure 3:
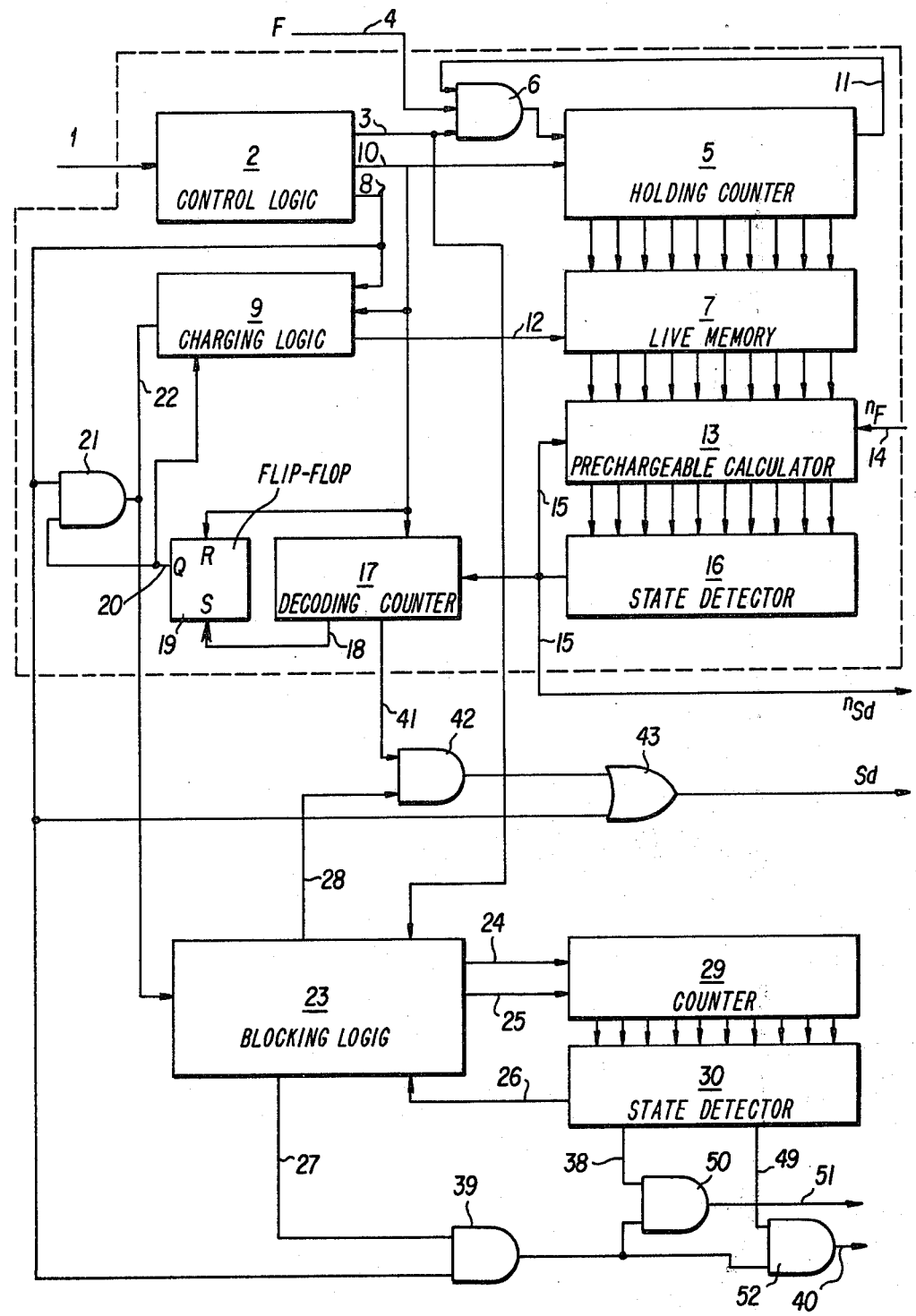
FIG. 3 illustrates a preferred embodiment of the electronic apparatus of the present invention.

Referring now to the drawings, wherein like reference numerals designate identical or corresponding parts throughout the several views, a preferred embodiment of the target fastened on the turning shaft whose angular position is to be determined, as shown in FIG. 1, requires a disk at the periphery of which are placed N identical and regularly spaced teeth of any shape, made of a material which is compatible with the choice of sensor so as to create discontinuities in form or material according to the method of affixing the teeth to the disk, or inside the disk. The choice of material may be left to the skilled artisan.

Figure 4:
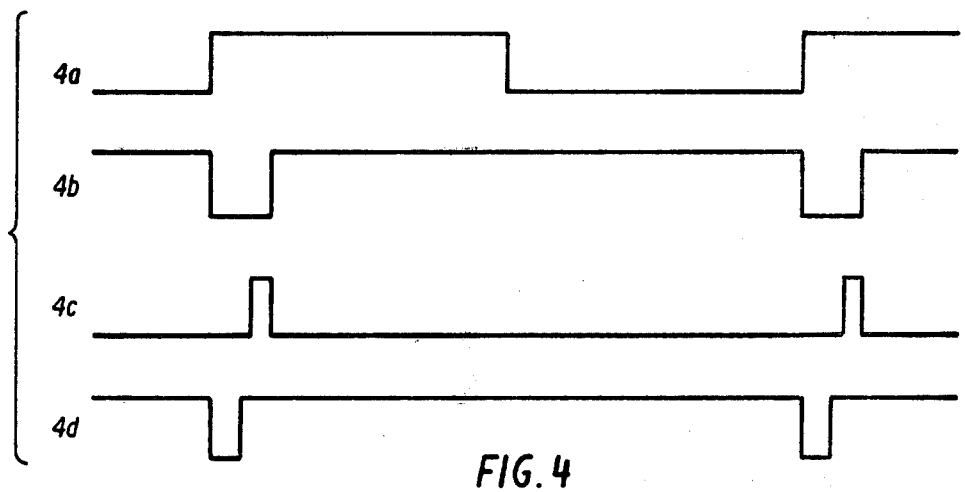
FIG. 4 illustrates chronograms relating to the control logic.
Figure 5:
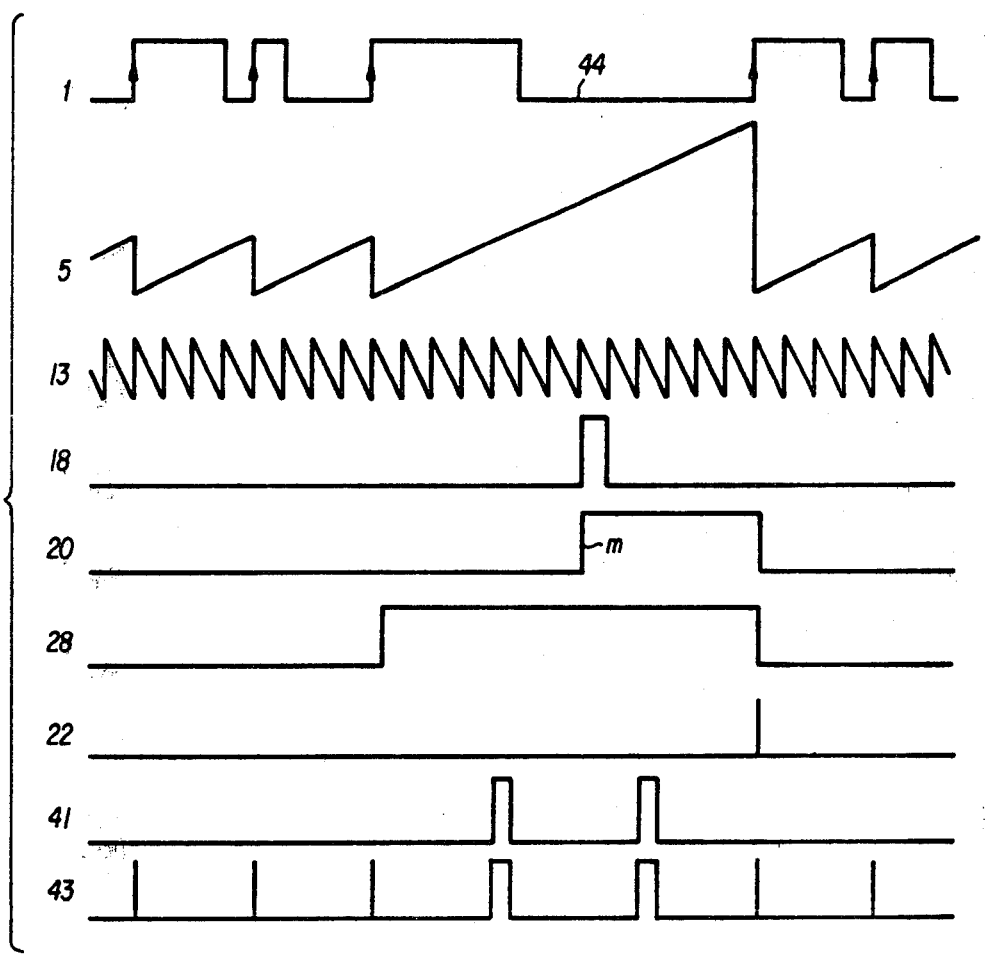
FIG. 5 illustrates chronograms relating to the detection of absent teeth and the restoration of absent teeth.
Figure 6:
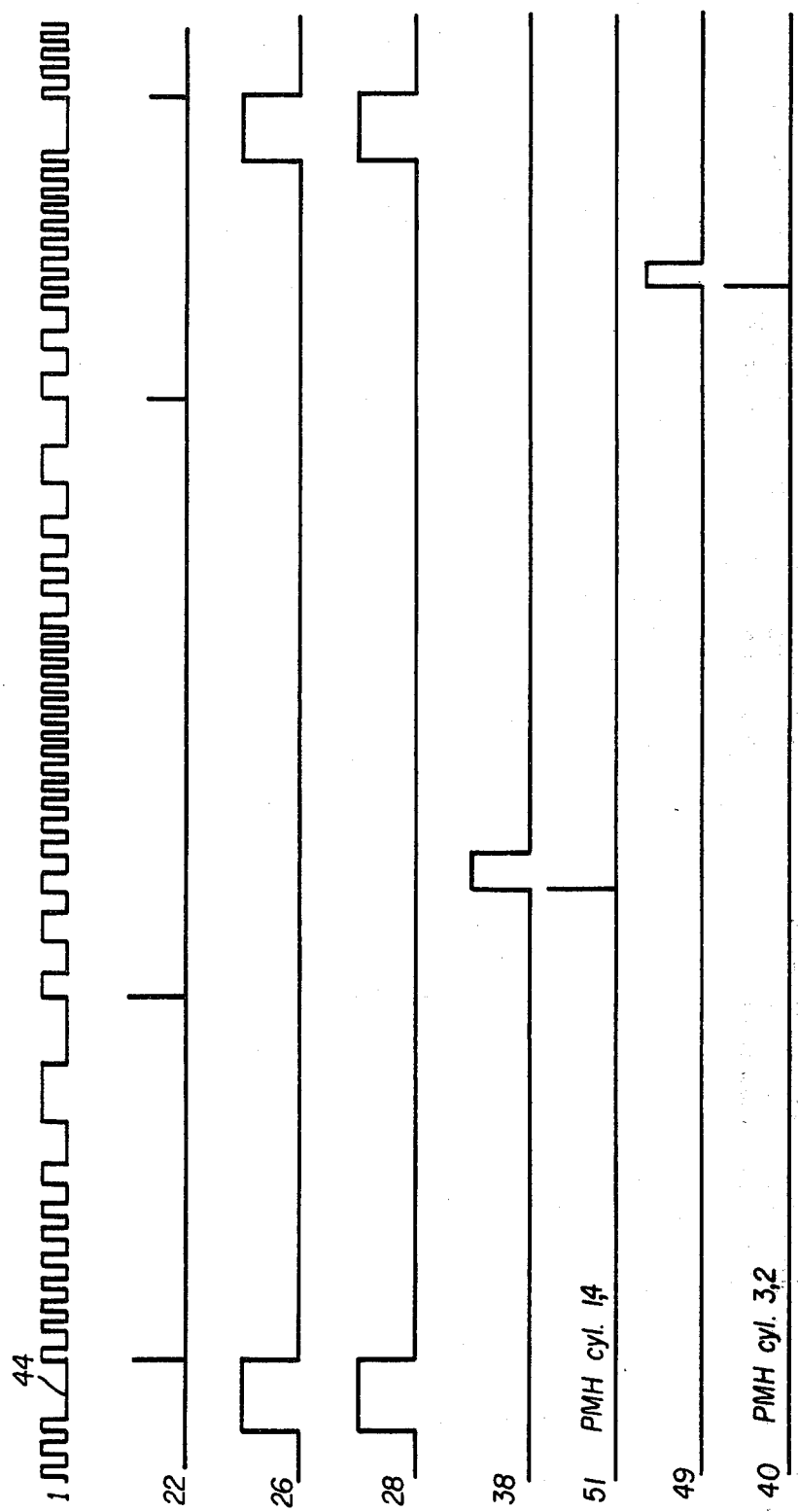
FIG. 6 illustrates chronograms relating to the system for blocking and restoring the particular positions of the engine cycle.

Passage of the teeth before the sensor induces an electric signal within the sensor which is processed by a connected electronic system which supplies signal 1, as illustrated by line 1 in FIGS. 5, and 6, and by line 4a in FIG. 4, an electrical image of the target, whose logic state is high when the sensor is opposite a tooth.

In order to obtain a reference signal in a preferential position of the turning shaft, two successive teeth have been eliminated on the target in 44, producing a guide mark. The angular positioning of discontinuity 44 cannot be just anywhere for proper operation of the system but must be the result of a study of the instantaneous angular speeds of the turning shaft. It preferably falls within a zone 45 (appearing in FIG. 2), within which the differential quotient of the angular speed is constant and possibly where the speed is highest, i.e., in a zone where the ratio:

$$\frac{\frac{dw}{dt}}{w^2}$$

is the lowest over the highest number of teeth, a ratio in which w is the angular speed of rotation of the target and of the associated crankshaft.

In effect, as can be seen in FIG. 2, the instantaneous angular speed of the crankshaft of an internal combustion engine of which it is proposed to mark the angular position is not steady during the starting phase but successively presents an acceleration phase 46 corresponding to the expansion of burned gas in the cylinder concerned and a deceleration phase 47 corresponding to the compression of the gas in another cylinder due to the next combustion, triggered by an electric spark and injection of fuel at the right moment. When the starting phase is completed, the angular speed of the crankshaft increases and phases 46 and 47 disappear under the effect of the inertial forces of the masses in motion.

The role of this device, the object of the present invention described and illustrated principally in FIG. 3 and, for the signal chronograms, illustrated in FIGS. 4, 5 and 6, has the purpose of producing an interpolation signal whose role is to multiply electronically the number of teeth on the target so as to obtain a more precise determination of the angular position of the turning shaft, to utilize this interpolation signal to detect the mark created by the absence of teeth 44, to generate reference signals, e.g., the arrival of the cylinders at their respective high dead points, and to recreate the absent teeth of the target as in 44.

For multiplication of the number of teeth, a process is used based on the division of a time interval T into n equal parts by means of a counter charged by the rhythm of a clock with frequency F and by means of a calculator having an output looped back upon itself and charging itself at the value $F \times T$ while discharging at the rhythm of a clock with frequency nF. In normal operation, there are n charging impulses of the calculator during period T; with the elimination of k teeth 44, this period becomes (k+1)T and there are (k+1)n charging impulses, which have only to be counted in order to generate a signal whenever the number is higher than m.

The number m is between n and (k+1)n and is chosen so as not to interfere with detection in the acceleration and deceleration phases. Experience has shown that a value between $$\frac{(k+2)n}{2} \text{ and } n\sqrt{k+1}$$

gives good results.

According to FIG. 3, which represents a non-limitative preferred embodiment of the electronic system connected to the position sensor, a signal 1 produced by the electronics of the position sensor is applied to a control logic 2, which, with each rising transition of signal 1, supplies three types of signals for guiding the apparatus: a signal 3 serving to inhibit the output signal 4 of a clock generating a frequency F and charging a holding counter 5 through an AND logic gate 6 during transfer of the contents of the holding counter 5 into a live memory 7 and reset of counter 5; a transfer signal 8 processed in a charging logic 9 whose operation will be described below; and a signal 10 for resetting the holding counter 5 before beginning measurement in the following period.

In FIG. 4, the following have been successively represented: in the first line, 4a, the (1) signal produced by the position sensor; in the second line, 4b, the signal (3) serving to inhibit the signal of the clock 4 through the logic AND gate 6; in the third line, 4c, the signal (10) for resetting the holding counter 5; and in the fourth line, 4d, the transfer signal 8.

Returning to FIG. 3, signals 10 and 8 are produced inside the control logic 2 from signal 1 supplied by the position sensor by means of two monostables having a very small time constant, one of which is released by signal 1 and the other by signal 10; signal 3 being at a low logic level when one of the monostables is in operation. These monostables can be implemented by means of simple logic gates. After counter 5 has been reset, the impulses of clock 4 are counted in counter 5 whose capacity is a function of frequency F, of the frequency dynamics of signal 1 and of the desired precision of interpolation measurement while signal 3 is at a high logic level. A decoding of the maximum capacity reached by counter 5 acts on logic gate 6 through the feedback loop 11 in order to cause it to pass into a low logic state and to block the charging of counter 5.

A live memory 7 having a capacity identical to that of the holding counter 5 stores the final state of the latter upon the appearance of a signal 12 produced by the charging logic 9. A prechargeable calculator 13, connected through its inputs to the outputs of the live memory 7, is emptied at the rate of a signal 14 supplied by a clock operating at frequency nF, and is continuously recharged by a signal 15 coming from a state detector 16 of calculator 13 at the value stored in the live memory 7 when the content of calculator 13 is equal to the value zero. The frequency of these impulses 15 is n times higher than the frequency of the input signal 1 and effects the interpolation of signal 1.

With reference to FIG. 5, the first three lines show, respectively, the form of the signal 1 produced by the position sensor, the form of the signal at the output of holding counter 5, and the form of the signal on the outputs of prechargeable calculator 13. On line 1, the pulses are of different widths in order to simulate the operation of the system with teeth of different widths.

Impulses 15 are computed in a decoding counter 17 which is regularly cleared to zero by signal 10.

Output 18 of state decoding m, as previously defined, serves to activate a flip-flop 19 of the RS type, storing this decoding until new signal 10 arrives to reset flip-flop 19 and counter 17.

Output 20 of flip-flop 19 is in the high logic state when the flip-flop is activated and allows the impulse 8 to pass through an AND logic gate 21. The impulse 22 coming from gate 21 only appears when a period higher than the preceding one has been detected. It must be understood that, in accordance with the present invention, the period of interest is the period separating two successive rising fronts represented by the arrows appearing on line 1 of FIG. 5. It follows that the teeth of the target do not need to be of a strictly constant width, a fact which constitutes an advantage of this system. A period higher than the preceding one corresponds to the passage of the portion 44 on the periphery of the disk of FIG. 1, on which several successive teeth have been eliminated opposite the position sensor. It will furthermore be noted that interference impulses 22 may be produced in the case of strong deceleration, especially before the high dead points of an internal combustion engine cycle in its starting phase, and that the blocking system 23 is the means provided to eliminate them. The impulse 22 is directed, on the one hand, towards charging logic 9 and towards a blocking logic 23 whose role it is to filter signals 22, which might appear in phase 47 after phase 45, and to let through only those which relate to detection of the absence of teeth.

Attention is once more drawn to FIG. 5, where, on the fourth line, the signal 18 appearing at the output of decoding counter 17 is shown; on the fifth line, signal 20 coming from RS flip-flop 19; on the sixth line, signal 28 appearing at the output of blocking logic 23 carrying the same reference; on the seventh line, signal 22 appearing at the output of the logic AND gate 21; on the eighth line, the form of signal 41 appearing on a second output of decoding counter 17 and reconstituting the absent teeth at 44 on the periphery of the target of FIG. 1; and, on the ninth line, the signal picked up at the output of a logic OR gate 43, which corresponds, in impulse form, to the signal 1 emitted by the position sensor at the input of the electronic circuit according to the present invention together with the reconstitution of the two absent teeth at 44.

Returning to FIG. 3, signal 22 relative to the detection of the absence of teeth 44 gives a signal 24 at the output of blocking logic 23 serving to reset a counter 29 incremented by a signal 25 which is nothing more than the signal 3 created in control logic 2 and processed by blocking logic 23. A state detector 30 of calculator 29 connected to the outputs of the latter generates, on the one hand, a signal 26 informing blocking logic 23 that counter 29 has been incremented as many times as the number of teeth separating two successive absences of teeth 44 and, on the other hand, a signal 38 which is generated after the counting of a number of teeth equal to that separating an absence of a tooth from one of the characteristic points of the engine cycle which is to be marked. The signal 38 can only be utilized when the system is blocked, i.e., when the signal 27 produced by blocking logic 23 is at high logic state and passes through an AND logic gate 39 so as to give a signal 40 (FIG. 6) having a width calibrated by the signal 8 produced by control logic 2.

Blocking logic 23 creates a signal 28 (FIG. 6) which has high logic state during the period of the absence of teeth and which allows a signal 41, resulting from the decoding of states n, 2n, ..., (k−1)n of decoding counter 17 (where k is the number of absent teeth), to pass through an AND logic gate 42 and to generate tooth signals which would have been obtained if the teeth had not been eliminated from the target. These signals, coming from the logic gate 42, are added in an OR logic gate 43 to the signal 8 appearing at each real tooth of the target to produce a signal at the output of gate 43 in the shape illustrated in the last line of FIG. 5.

Figure 7:
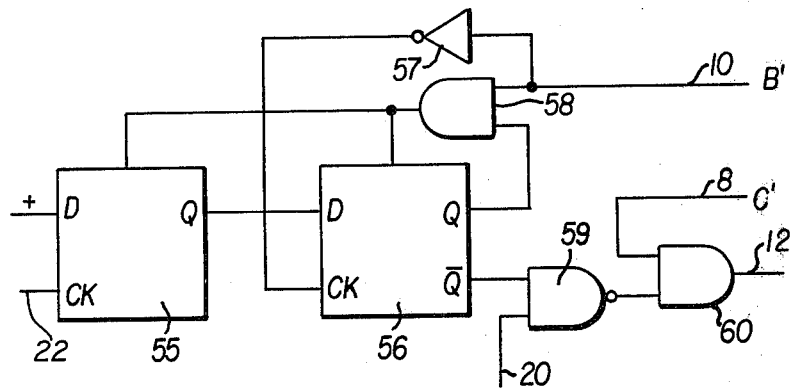
FIG. 7 illustrates a preferred embodiment of the charging logic 9 of FIG. 3.

The charging logic 9, a preferred embodiment of which is illustrated in FIG. 7, prohibits the storing in live memory 7 of the result present in holding counter 5 at the time of decoding of a period higher than the preceding one given by signal 22, but forces the storing in live memory 7 of the result present in holding counter 5 at the time of the appearance of two consecutive signal 22, a phenomenon which can occur in the voltage phase or in phase 47 following phase 45 (FIG. 2).

The charging logic 9 comprises two D type flip-flops 55 and 56, with the non-reversing output of the first one being connected to the input of the second one, an inverter 57, two logic AND gates 58 and 60 of the ET type, and a logic gate 59 of the NAND type. Reset signal 10, coming from control logic 2, is transmitted to the inverter 57, which communicates it to the clock input of flip-flop 56, on the one hand, and, on the other, to the reset inputs of flip flops 55 and 56 through AND logic gate 58, whose second input is connected to the non-reversing output of flip-flop 56. The reversing output of flip-flop 56 is in turn connected through its second input to the non-reversing output of the RS flip-flop 19 in order to receive signal 20. The output of the logic NAND gate 59 is connected to an input of logic gate 60 with AND function whose second input receives the transfer signal 8 coming from the control logic 2. The output of AND logic gate 60 is connected by lead 12 to live memory 7 of FIG. 3 so as to trigger the transfer of information stored in the live memory 7 to counter 13. Input D of flip-flop 55 is connected to the battery positive terminal and the clock input of the flip-flop 55 is connected to the output of AND logic gate 21 so as to receive from it signal 22.

The two flip-flops 55 and 56 serve the purpose of preventing storage in live memory of the contents of the holding counter 5 following detection of a period higher than the preceding one but assist in storage upon two consecutive detections signals 22.

In their initial state, the two flip-flops 55 and 56 are at zero.

With the output $\bar{Q}$ of the second flip-flop 56 being at one, output Q, signal 20 of RS flip-flop 19 blocks the charging impulses 8 upon first detection of a period higher than the preceding one. With the rising edge of signal 22, the first flip-flop 55 moves to one and induces a change to one of the second flip-flop 56 with the descending edge of reset signal 10, enabling reset of the two flip-flops 55 and 56 for the next signal 10.

If a second detection of a higher period arrives before reset signal 10, the output Q, signal 20 of RS flip-flop 19 moves to one, but, being activated, the second flip-flop 56 has its output $\bar{Q}$ at zero. The impulse 1 supplies a charging impulse 12.

In effect, in stabilized operation, good precision is required for the interpolation signal, and storage of a period having an absence of teeth would impair the quality of this interpolation. On the other hand, in the starting phases, with the number stored in live memory 7 being any number whatsoever, there could be impulses 22 occurring with each tooth. In order to avoid this, the charging of a period measured using counter 5 is forced into live memory 7.

Figure 8:
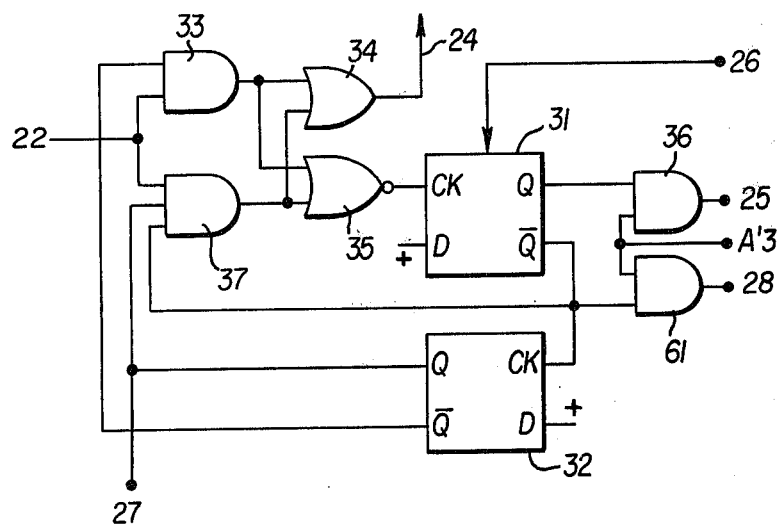
FIG. 8 illustrates a preferred embodiment of the blocking logic 23 of FIG. 3.

The blocking logic 23, whose role it is to filter signals 22 appearing in phase 47 following phase 45 and to let through only those which relate to detection of the absence of teeth, is illustrated in FIG. 8, which is a preferred embodiment. The system blocks automatically when counter 29 is incremented by a value equal to the number of teeth separating two absences of teeth and does not authorize a reset of the counter 29 by signal 24 if counter 29 has not been incremented to the blocking value. Through two of its outputs 27 and 28, it enables the logic outside blocking system 23 to be informed of the blocking or non-blocking state and of the position of the sensor before an absence of teeth 44.

In its initial state, two type D flip-flops 31 and 32 are at rest and their outputs Q are in the low logic state. Signal 22, coming from logic gate 21, can only pass through an AND logic gate 33 and an OR logic gate 34 so as to generate a signal 24 for resetting counter 29. The signal from logic gate 33 is also directed towards a NOR logic gate 35 whose output is connected to the clock input of D flip-flop 31 having an output Q which goes into high logic state and thus enables signal 3 from the control logic 2 to pass through an AND logic gate 36 so as to generate a signal 25 utilized as a clock signal by counter 29. Signal 26, appearing whenever counter 29 has been incremented by a number of times equal to the number of teeth separating two absences of teeth 44, acts upon the reset (clear) of flip-flop 31, whose output Q, connected to D flip-flop 32, goes into a high logic state and causes output Q of D flip-flop 32 to move to a high logic state, thus blocking the system. As long as the system is not blocked, each signal 22 from logic gate 21 sets counter 29 at zero. When the system is blocked, output $\bar{Q}$ of flip-flop 32 is in a high logic state and blocks logic gate 33. Impulses 22 now pass through AND logic gate 37 only if output $\bar{Q}$ of 31 is in high logic state. There can be no resetting of counter 29 by a signal 22 as long as there has not been a signal 26. Signal 27, coming from output Q of flip-flop 32, is utilized, on the other hand, to give information on the blocking state of the system.

Referring to FIG. 6, the signal emitted by the position sensor at the input of the system is represented in the first line under the hypothesis of successive acceleration and deceleration as presented in FIG. 2. In particular, position 44 of the missing teeth will be noted. In the second line, signal 22 is represented, appearing at the output of the logic AND gate 21. On the third line, signal 26 leaving state detector 30 is represented while the fourth line shows the signal 28 appearing at the output of the logic AND gate 61 of blocking logic 23 of FIG. 8. On the fifth and seventh lines of FIG. 6, the signals appearing respectively on the two outputs 38 and 49 of state detector 30 of FIG. 3 are represented. The sixth line of FIG. 6 illustrates the signal which is received on a lead 51 at the output of a logic AND gate 50, a first input of which is connected to output 38 of state detector 30 of FIG. 3, and the second input of which is connected to the output of a logic AND gate 39 which receives, through its inputs, respectively, signal 8 from control logic 2 and signal 27 giving the blocking state of blocking logic 23. The signal 51 gives the position in the cycle of the high dead point corresponding to cylinders 1 and 4. In an analogous manner, line eight of FIG. 6 illustrates the signal which is received on a lead 40 at the output of a logic AND gate 52, a first input of which is connected to the output of the logic AND gate 39 with AND function. The signal 40 gives the position in the cycle of the high dead point corresponding to cylinders 3 and 2. Signal 28, appearing at the output of the logic AND gate 61 with AND function (FIG. 8), shown on line four of FIG. 6, gives information on the absence of teeth 44.

Figure 9:
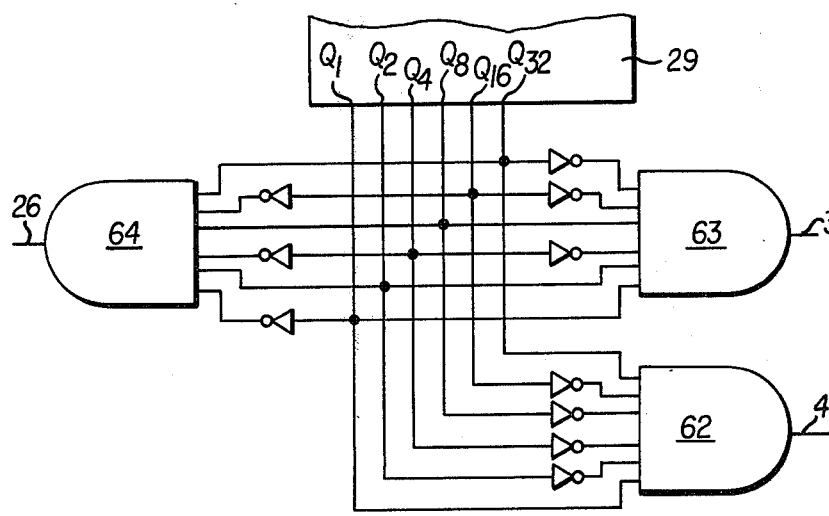
FIG. 9 illustrates a preferred embodiment of state detector 30 illustrated in FIG. 3.

Finally, FIG. 9 illustrates an embodiment of state detector 30 of calculator 29 having as inputs $Q_1$, $Q_2$, $Q_4$, $Q_8$, $Q_{16}$, and $Q_{32}$. State detector 30 comprises essentially three logic AND gates 62, 63 and 64, each grouping the six inputs of the state detector, either directly or by means of inverters. The outputs of the state detector are leads 49, 38, and 26 previously discussed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining the angular position of a part in rotational motion, comprising the steps of:
   providing a disk coupled to said part in rotational motion and rotational therewith, said disk including a plurality of alternating teeth and spaces located about its circumferential periphery, said disk and said part in rotational motion rotating at an angular velocity w;
   removing at least one of said plurality of teeth located on said periphery of said disk to form an absolute mark on said disk, said absolute mark being located at a point on the periphery of said disk wherein the ratio $$\frac{dw/dt}{w^2}$$

is the lowest over the highest number of said plurality of teeth;
   providing a position sensor means located in an adjacent relationship to said periphery of said disk, said disk rotating past said position sensor means, said position sensor means detecting the passage of said alternating teeth and spaces and said absolute mark, said position sensor producing an electrical output position signal; and
   performing an electronic interpolation on said electrical output position signal in an electronic processor, said electronic processor producing an output signal which represents the angular position of said part in rotational motion for both a constant rotational speed and a variable rotational speed of said part.

2. A device for determining the angular position of a part in rotational motion, comprising:
   a disk coupled to said part in rotational motion and rotational therewith, said disk including a plurality of alternating teeth and spaces located about its circumferential periphery, at least one of said teeth being removed to form an absolute mark;
   position sensor means located in an adjacent relationship to said circumferential periphery of said disk for producing a sensor output signal corresponding to the passage of said alternating teeth and spaces and said absolute mark by said position sensor means;
   interpolation means coupled to receive said sensor output signal for performing an electronic interpolation on said sensor output signal and for producing an interpolation output signal, said interpolation output signal being produced each time said interpolation means detects an increase in the period of said sensor output signal;
   blocking means coupled to said interpolation means for producing a blocking signal, said blocking signal being generated only when said interpolation output signal corresponds to the passage of said absolute mark by said position sensor means; and
   position restoration means coupled to said interpolation means and to said blocking means for generating at least one position output signal, said at least one position output signal representing a particular angular position of said part in rotational motion with respect to said position sensor means.

3. A device for determining the angular position of a part in rotational motion as recited in claim 2, wherein said interpolation means comprises:
   first clock means for generating a first clock signal having a frequency F;
   second clock means for generating a second clock signal having a frequency N times the frequency of said first clock signal;
   control logic means coupled to receive said sensor signal and said first clock signal for gating said first clock signal in synchronism with said sensor signal;
   holding counter means coupled to said control logic means for accumulating said first clock signal as gated by said control logic means;
   live memory means coupled to said holding counter means and to said control logic means for storing the contents of said holding counter means as controlled by said control logic means;
   calculator means coupled to said live memory means and coupled to receive said second clock signal, for receiving the contents of said live memory means as controlled by a transfer signal and for reducing said contents received from said live memory means at a rate controlled by said second clock signal;
   first state detector means coupled to an output of said calculator means for generating said transfer signal, said transfer signal being repeatedly generated each time the contents of said calculator means is reduced to a predetermined value; and
   second counter means coupled to said control logic means and coupled to receive said transfer signal for counting the number of times said transfer signal occurs between the passage of succeeding leading edges of said teeth past said position sensor and for generating said interpolation output signal, said second counter means being reset by said control logic means.

4. A device for determining the angular position of a part in rotational motion as recited in claim 3, wherein said position restoration means comprises:

discontinuity counter means coupled to said blocking logic means for counting the number of said teeth passing said position sensor means between occurrances of said interpolation output signal;

second state detector means coupled to receive an output of said discontinuity counter means for producing at least one state output signal, said at least one state output signal being produced when the contents of said discontinuity counter means equals a predetermined number corresponding to a particular angular position of said part in rotational motion; and gate means coupled to receive said at least one state output signal, said blocking signal, and said interpolation output signal for comparing said signals and for producing said at least one position output signal.

* * * * *